US008396279B1

(12) United States Patent
Ferris et al.

(10) Patent No.: US 8,396,279 B1
(45) Date of Patent: Mar. 12, 2013

(54) METHOD AND SYSTEM FOR TRANSACTION DECISION MAKING

(75) Inventors: Laura M. Ferris, Chicago, IL (US); Richard L. Norman, Dallas, TX (US); Anthony B. Gerevics, Orchard Park, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 13/425,966

(22) Filed: Mar. 21, 2012

Related U.S. Application Data

(63) Continuation of application No. 12/901,730, filed on Oct. 11, 2010, now Pat. No. 8,165,381, and a continuation of application No. 10/874,227, filed on Jun. 24, 2004, now abandoned.

(51) Int. Cl.
*G06K 9/00* (2006.01)

(52) U.S. Cl. .......................................................... 382/137

(58) Field of Classification Search .................. 382/137, 382/138, 139, 140; 705/1, 35, 39, 45
See application file for complete search history.

(56) References Cited

U.S. PATENT DOCUMENTS

| | | | |
|---|---|---|---|
| RE31,692 E * | 10/1984 | Tyburski et al. | 382/140 |
| 6,728,397 B2 * | 4/2004 | McNeal | 382/137 |
| 6,763,997 B2 * | 7/2004 | Bennett et al. | 235/375 |
| 7,200,255 B2 * | 4/2007 | Jones et al. | 382/135 |
| 2003/0055783 A1 * | 3/2003 | Cataline et al. | 705/40 |

* cited by examiner

*Primary Examiner* — Atiba O Fitzpatrick
(74) *Attorney, Agent, or Firm* — Hunton & Williams LLP

(57) ABSTRACT

According to one embodiment, the present invention relates to a method and a system for transaction decision making. According to an exemplary embodiment, a method and system for processing payment items involve receiving a payment item at a sorter device; extracting electronic data from the payment item from an electronic readable line of the payment item; imaging the payment item to obtain image data of the payment item; comparing the electronic data and the image data to verify payment data associated with the payment item; and determining an optimal settlement path for the payment item, at the sorter device.

26 Claims, 3 Drawing Sheets

METHOD AND SYSTEM FOR TRANSACTION DECISION MAKING

RELATED APPLICATIONS

This patent application is a Continuation of U.S. patent application Ser. No. 12/901,730, filed Oct. 11, 2010 entitled "METHOD AND SYSTEM FOR TRANSACTION DECISION MAKING", which is a Continuation of Ser. No. 10/874,227, filed Jun. 24, 2004 entitled "METHOD AND SYSTEM FOR TRANSACTION DECISION MAKING", the disclosures of which are hereby incorporated by reference in their entireties.

FIELD OF THE INVENTION

The present invention relates generally to making transaction decisions for payment items (e.g., checks, etc.) and, more particularly, to a method and system for comparing electronic data extracted from a payment item and image data of the payment item and determining an optimal settlement path.

BACKGROUND OF THE INVENTION

Check conversion generally refers to a payment that begins with a paper check and ends as an electronic debit. The paper check may be truncated/converted into an electronic debit entry early in the check handling cycle for subsequent electronic processing. Currently, checks may be converted using Automated Clearing House (ACH) payment system, ATM networks or other mechanisms. Other clearing channels may include Image Replacement Document (IRD), image exchange, and other channels. As a result, the efficiencies of electronic payments are realized while customers still continue to write paper checks.

Currently, various electronic payments, such as automatic payroll deposits and debit card purchases, may be handled and processed. As a result, corporations and consumers can reduce or eliminate the use of paper checks to make routine and other payments. Examples of electronic payments include salaries, consumer and corporate bill payments, interest and dividends, and Social Security and other entitlement programs.

Many entities, including corporations, have been able to realize significant savings by collecting recurring consumer payment obligations by debiting consumers' bank accounts electronically after obtaining approval of the bill payer to debit his or her bank account periodically for the amount owed. A consumer or a corporation can make an electronic credit payment instead of issuing a paper check.

As more banks and other entities participate in various electronic payment systems, additional requirements may be implemented for each receiving entity. For example, different recipients may implement different mechanisms for identifying, receiving and/or processing electronic payments. Further, different banks may implement different electronic payment requirements. These inconsistencies and specific requirements may lead to errors and inefficiencies in transmitting and receiving electronic payments. Such errors and inefficiencies will inevitably lead to delays and higher costs.

Currently, each settlement channel has its own settlement accounting system, resulting in various inefficiencies and duplicative efforts due to the support of multiple accounting systems.

In view of the foregoing, it would be desirable to provide a method and system for electronic check conversion which overcome the above-described inadequacies and shortcomings.

SUMMARY OF THE INVENTION

According to an embodiment of the present invention, method and system provides for transaction decision making where comparing electronic data extracted from a payment item and image data of the payment item are compared and an optimal settlement path is determined.

According to an exemplary embodiment of the present invention, a computer implemented method for processing payment items comprises the steps of receiving a payment item at a sorter device; extracting electronic data from the payment item from an electronic readable line of the payment item; imaging the payment item to obtain image data of the payment item; comparing the electronic data and the image data to verify payment data associated with the payment item; and determining an optimal settlement path for the payment item, at the sorter device.

In accordance with other aspects of the exemplary embodiment of the present invention, the image data is converted to electronic image data by optical character recognition where the electronic data and the electronic image data are compared; the step of comparing further comprises the step of comparing one or more of payee name, date, amount and signature associated with the payment item; the step of comparing further comprises the step of accessing one or more databases to identify potentially fraudulent activity; the step of comparing further comprises the step of accessing account data to identify positive and negative account data; the step of comparing further comprises the step of determining special instructions associated with the payment item, wherein the special instructions comprise one or more of stop payment orders, do not pay items, and illegitimate account data; the step of comparing further comprises the step of determining instructions to modify data associated with the payment item; the method further comprises the step of extracting data from the payment item for targeting one or more potential customers; wherein the optimal settlement path comprises one or more of IRD, ACH, ARC, ECP, posting to a consumer account, wire transfer and data archive; wherein the step of imaging is performed at a front-end device; and wherein the front-end device comprises one or more of an ATM device and branch location.

According to another exemplary embodiment of the present invention, a computer implemented system for processing payment items comprises receiving module for receiving a payment item at a sorter device; extracting module for extracting electronic data from the payment item from an electronic readable line of the payment item; imaging module for imaging the payment item to obtain image data of the payment item; matching module for comparing the electronic data and the image data to verify payment data associated with the payment item; and decisioning module for determining an optimal settlement path for the payment item, at the sorter device.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

A system and process for improving efficiency of processing payment items is described. According to one exemplary aspect, the system and process is directed to transaction decision making.

Figure 1:
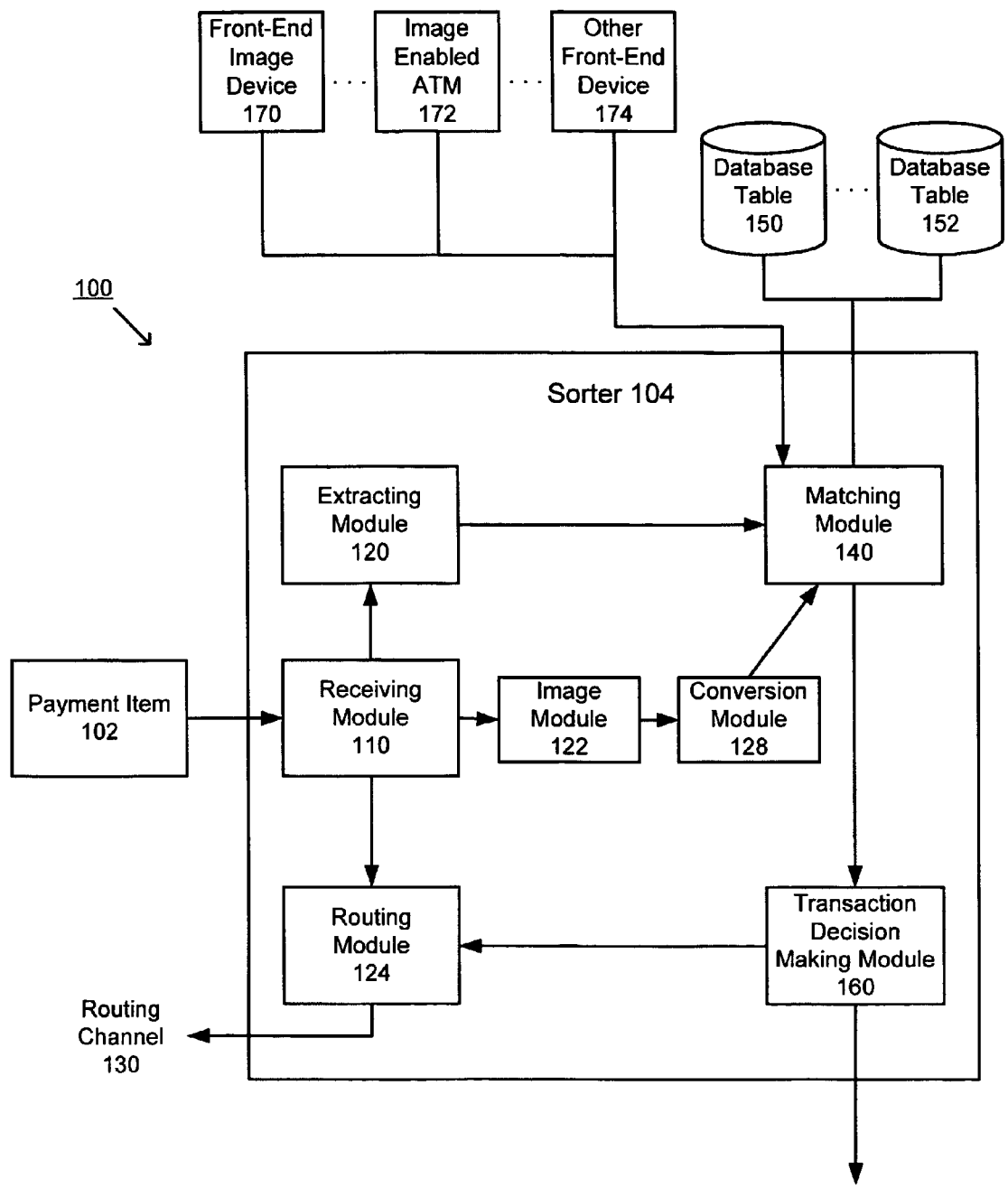
FIG. 1 is an exemplary system illustrating transaction decision making, in accordance with an embodiment of the present invention.

FIG. 1 is an exemplary system illustrating transaction decision making, in accordance with an embodiment of the present invention. System 100 illustrates an exemplary environment for processing payment items. A payment item 102, such as a check, may be received at Sorter 110. Payment items may include checks, cash tickets, deposit tickets, commercial paper and other paper instruments. The payment item 102 may contain information, such as a payee, legal amount (e.g., amount written), courtesy amount (e.g., numerical representation of legal amount), signature, memo, other identifiers and/or other data. Pre-printed information may include payor identification information, such as payor name, payor address, payor telephone, and other information. Depending on the type of payment item, different data may be included and/or printed. In the example of a check, the payment item may include a Magnetic Ink Character Recognition (MICR) line, which contains routing number, account number, MICR amount, check number, and/or other electronically readable numbers and/or codes. A pre-printed commercial check may include a MICR dollar amount. In addition, payment items may also include serial numbers (or other identifiers). For example, serial numbers may represent a business check, store identifier, check numbers, process codes, transaction codes and/or other information. Other identifiers may include field numbers, position numbers which may be used to earmark checks as truncated items, expedited returns, RD or other types of payment items.

Sorter 104 may include various modules for performing functions associated with capturing an image from the payment item, reading electronic information, determining an appropriate route and/or performing other related functions. Sorter 104 may include Receiving Module 110, Extracting Module 120, Image Module 122, Conversion Module 128, Routing Module 124, Matching Module 140, Transaction Decision Making (TDM) Module 160 and/or other module(s). The modules of Sorter 104 may be further combined, duplicated and/or separated. The modules may also be provided across multiple sorters and/or other devices. Sorter 104 may communicate with various databases, sources of information, front end devices, and/or other modules. For example, Matching Module 140 may communicate with one or more databases 150. Communication may be established through various modes of electronic communication, including Internet, Intranet, Ethernet, wireless communication and/or other modes of communication.

Sorter 104 may be included in or connected to an image enabled front-end device (e.g., ATM, teller or other remote device), an image machine for commercial customers, and/or other type of device. For example, at a front counter, a teller or other entity may capture transaction image and data during a customer transaction process. In another example, a banking center personnel may capture transaction image and data subsequent to the customer transaction process. ATM image capture may provide the ability to capture transactions made at an ATM (or other similar interface). Image and data from a customer transaction process may be captured via other processes as well.

Sorter 104 may be located at or connected to a regional processing center, lockbox locations and/or other location. Lockbox locations may include a national retail lockbox, wholesale lockbox, regional retail lockbox and/or other types of lockbox locations. National retail lockbox may include a check collection system in which a bank or third party receives, processes and deposits a company's mail receipts. Wholesale lockbox may include a moderate number of large dollar remittances, with varied documentation, usually from corporation to corporation. Regional retail lockbox may include a local processing site rather than a national or network processing site. In addition, Sorter 104 may represent an image capture device located at a business location.

Receiving Module 110 may receive the payment item. Receiving Module 110 may receive the actual physical payment item. In another example, Receiving Module 110 may receive an image of the payment item and/or other electronic data identifying or describing the payment item.

Extracting Module 120 may extract electronic data from the payment item. Electronic data may include data from the MICR line. For example, Extracting Module 120 may read the MICR line of the payment item that contains the routing number, account number, check number and in some cases, the MICR dollar amount as well as other electronic information.

Image Module 122 may take one or more images of the payment item. The image may include a front image of the payment item, a back image of the payment item, a portion of the payment item or other image. For example, the image of a front side of the payment item may include the printed name, address, date, payee name, courtesy amount, legal amount, memo line and/or signature. An image of a back side of the payment item may include endorsement information, instructions, processing stamps, and/or other information.

Conversion Module 128 may convert the image from Image Module 122 to electronic data. For example, the image may be converted by optical character recognition (OCR) or other method into electronic information.

Routing Module 124 may route the payment item to an appropriate channel or destination as to be determined by a Transaction Decision Making Module 160. The actual physical payment item may be received at Routing Module 124 and routed to an appropriate channel 130. Possible routing options may include substitute check (e.g., IRD, etc.), destroy product, process product, check conversion (e.g., ACH, ECP, image presentment, etc.), PoS, wire conversion, return to presenting bank, and/or other routing options.

Matching Module 140 may compare the electronic data from the MICR line from Extracting Module 120 and the electronic data from the image of the payment item from Conversion Module 128. Matching Module 140 may verify data from the payment item as well as data from other sources of information, external and/or internal sources. For example, Matching Module 140 may verify the MICR amount, if available, with the legal amount and/or courtesy amount. In another example, the legal amount and the courtesy amount may be verified. Other matching capabilities may include verifying name, payee name, date, address, signature and/or other information.

Matching Module 140 may verify various information concerning the payment item. For example, one or more databases 150, 152 may be accessed to determine whether the MICR information is valid, whether there is a potential for fraudulent activity, whether the MICR number should be altered and/or other determination. According to another example, an account table or other resource may be accessed where the account table maintains positive and negative account files. For example, the account table may determine whether an account number is associated with a closed account or other negative account. The account table may also identify stop payment items, do not pay items and other special instructions associated with the payment item, account number and/or other identifier. The account table may also validate legitimate accounts and other authorized payments and/or instructions. Other data may be verified at Matching Module 140.

According to another example, certain data may be extracted from the payment item for targeting potential customers and/or other business objective. This process may occur at the Matching Module 140 and/or Extracting Module 120 or other component within Sorter 104. For example, a payment item may be a check that is issued by a first bank and made payable to a second bank, as the payee. The first bank may use this information to determine that the payor, who may be a retail bank customer, is using the second bank's credit card. This information may then be used to send an offer (e.g., promotion, advertisement, etc.) to the retail bank customer in an attempt to acquire business. The offer may be sent as an electronic offer (e.g., email, etc.), mailer or other type of communication. Other business objectives may be achieved by gathering data. Additional information may be gathered to further target or customize the offer.

TDM Module 160 may determine how to process the payment item, while the payment item is in Sorter 104. TDM Module 160 may represent a sophisticated rules engine that accesses account information, payee information, banking rules and/or other information in performing transaction decisions.

TDM Module 160 may also determine an appropriate form of processing. For example, TDM Module 160 may determine whether the payment item is to be expedited. Under certain circumstances (e.g., check for over a threshold amount, such as $10,000), the payment item may be settled an alternate method, such as conversion to a substitute check, requirement for multiple endorsements, etc. TDM Module 160 may also determine whether the payment item should be processed as a paper item through regular or other channels. TDM Module 160 may determine whether the payment item should be converted into an image where the paper version is destroyed. In addition, TDM Module 160 may determine whether to charge against a credit line, the image data or other data may be archived, perform an image exchange, convert to an image exchange, perform an on-us transaction and other determination. An on-us transaction may include any electronic banking transaction in which the acquiring bank and the issuing bank are the same institution. In some instances, human intervention may be appropriate. For a wire transfer, a manual review may be initiated when the amount is over a threshold amount (or other condition is satisfied). A verification process, fraud review and/or other process may be applied for certain types of transactions. Other processing channels may be determined and initiated.

According to various embodiments of the present invention, TDM improves float, reduces transportation cost of paper checks or other paper payment items, and is flexible for the customer, bank processing and/or other participant. TDM may be deployable out to branch locations, lockboxes, ATMs, cash vaults, regional processing centers and/or other locations and devices.

With scanners at remote locations, such as ATMs, branch locations, a payment item may be scanned and TDM may automatically decide on whether the paper payment item can be destroyed. According to another embodiment of the present invention, front-end image device 170, image enabled ATM 172 and other front-end device 174 may scan an image of the payment item or other data associated with the payment item. Front-end image device 170 may include teller machines, capture devices, and/or other point of sale terminals. Image enabled ATM 172 may include devices for validating transactions (e.g., whether funds are available, whether other criteria are met, etc.). In this exemplary embodiment, an image of the payment item may be presented rather than the paper payment item for payment. In another example, another financial institution may transmit a file of check images and data for posting to a Demand Deposit Account (DDA) accounts. As a result, the paper payment item is not received at Receiving Module 110. For example, a front-end image device may be part of a remote image enabled ATM 172.

In another example, a teller at a branch location may enter information, such as payment amount, into an electronic file. The paper payment item may be received at Sorter 104 and later matched with the electronic file with data associated with each paper payment item. For example, as the paper payment item is received at Receiving Module 110 or other module of Sorter 104, electronic data may be matched with the paper payment item at Matching Module 140.

Figure 2:
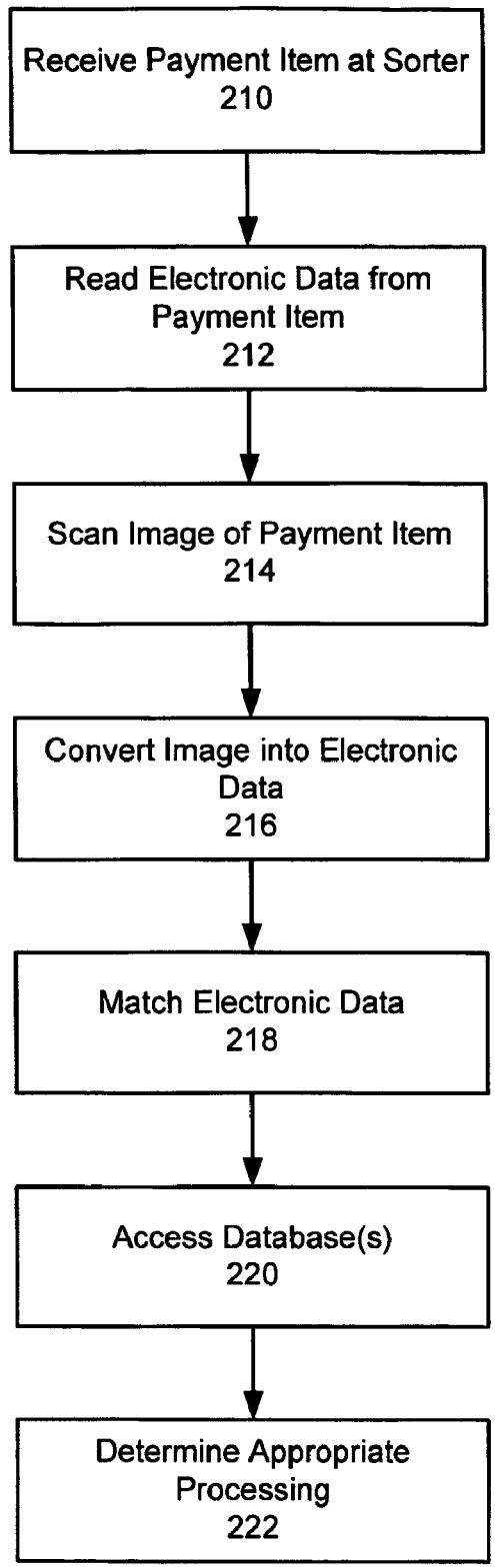
FIG. 2 is an exemplary flowchart illustrating a method for transaction decision making, in accordance with an embodiment of the present invention.

FIG. 2 is an exemplary flowchart illustrating a method for transaction decision making, in accordance with an embodiment of the present invention. At step 210, a payment item may be received at a sorter. The sorter may be local or remote. At step 212, electronic data from the payment item may be scanned or otherwise read by the sorter. Electronic data may include MICR line, routing number, account number, check number, MICR dollar amount and/or other data from the payment item. Depending on the type of payment item, different electronic data may be scanned at the sorter. At step 214, an image of the payment item may be scanned. The image may be the front of the payment item, back of the payment item and/or a portion of the payment item. In another example, an image of the payment item or other data may be received from a front-end device. At step 216, the image may be converted to electronic data. For example, the conversion may be accomplished by OCR or other method.

At step 218, the electronic data from the payment item at step 212 and the electronic data from the image at step 214 or 216 may be matched or otherwise compared. For example, this may involve verifying MICR amount, name, address, signature and/or other data associated with the payment item. In addition, information regarding the payment item, payor, payee, transaction, etc. may be extracted for business applications, such as promotions, targeted advertisements, etc. If non-matching is determined, business rules may be applied, which may include returning the payment item, marking the payment item with an indication of a non-match and/or other action.

At step 220, one or more databases and/or other sources of data may be accessed to verify and/or confirm additional information. For example, MICR information may be verified, potential fraudulent activity may be determined, alternations to the payment item may be identified and/or other determinations may be made. For example, fraudulent activity may be determined by assessing whether account information is valid. In addition, positive and negative account information may be accessed to verify valid accounts.

At step 222, appropriate processing for the payment item may be determined. For example, a transaction decision making module may determine whether the payment item should be expedited, processed via channels, etc. Other processing determinations may be performed. While the process illustrated in FIG. 2 discloses certain steps performed in a particular order, it should be understood that the present invention may be practiced by adding one or more steps to the process, omitting steps within the process and/or altering the order in which one or more steps are performed.

Figure 3:
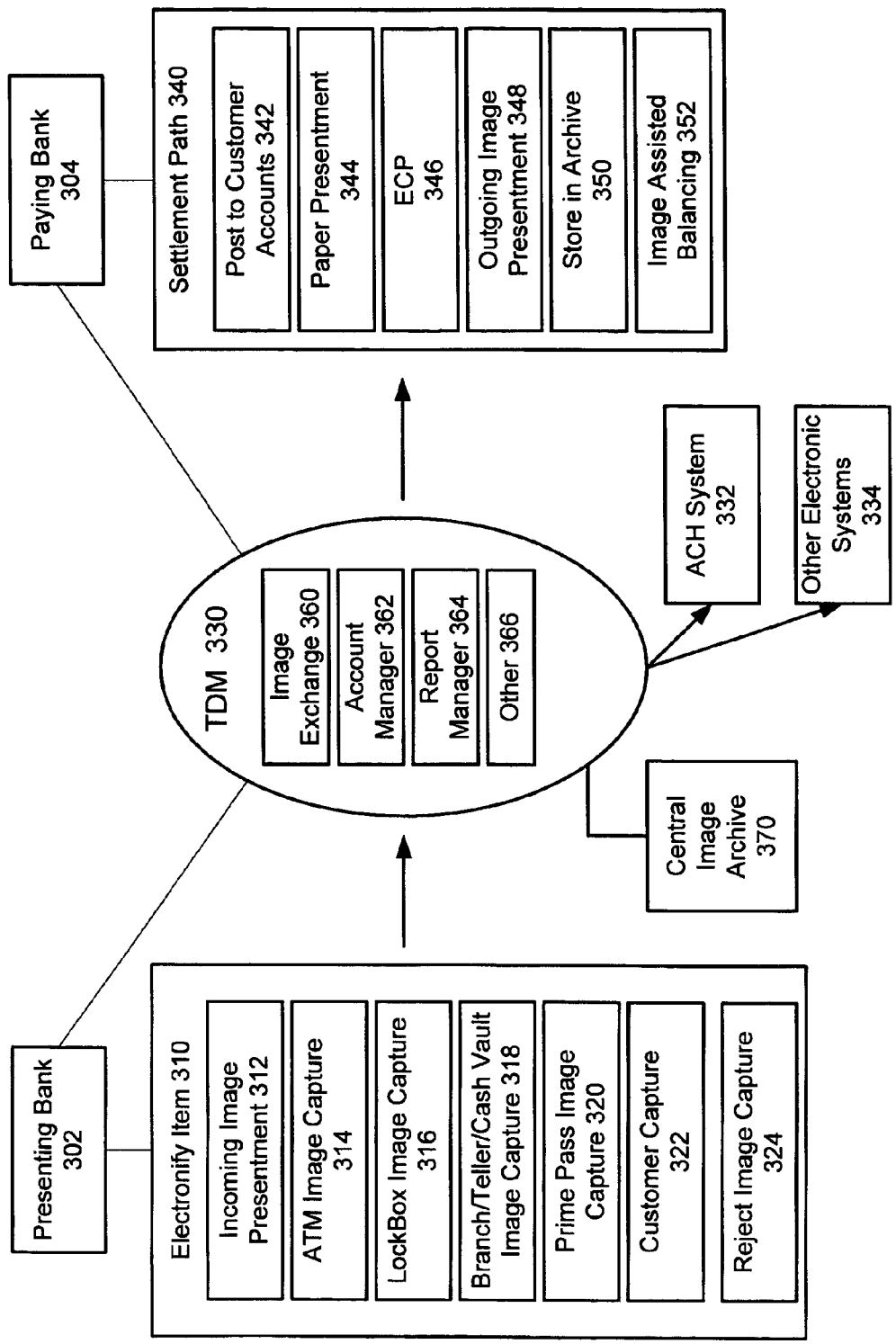
FIG. 3 is an exemplary system illustrating transaction decision making, in accordance with an embodiment of the present invention.

FIG. 3 is an exemplary system illustrating transaction decision making, in accordance with an embodiment of the present invention. According to an aspect of an embodiment of the present invention, TDM 330 may electronify paper check processing and deliver a flexible electronic transaction processing system for check image, which may be leveraged across multiple payment types. A payment item may be electronified as it is received, as shown by 310. TDM 330 may route the truncated checks and images for settlement and/or image archives, via a settlement path 340. The payment item may be converted to electronic format at a front-end interface or immediately upon receipt at the sorter. TDM 330 may determine appropriate processing for the payment item, including settlement, image archiving and/or other type of processing. For example, the payment item may be converted to an ACH system or other electronic systems. Other options may include image assisted balancing, posting to customer accounts, electronic check presentment (ECP), storing in an archive (e.g., branch, customer service desktops, image and Internet settlements, CD-ROM and other storage options) and/or other settlement path.

Electronify item 310 represents acquisition of check, data and image where items are captured at an initial point of entry. Electronify item 310 may involve various types of data capture, such as Incoming Image Presentment 312, ATM Image Capture 314, LockBox Image Capture 316, Branch/Teller/Cash Vault Image Capture 318, Prime Pass Image Capture 320, Customer Capture 322 and Reject Image Capture 324. Other types of methods for capturing data may be implemented.

Incoming Image Presentment Capture 312 may involve presenting an image rather than the actual payment item for payment. For example, a check image may be presented rather than the paper check for payment. In another example, a financial institution may transmit a file of check images and data from another financial institution for posting to DDA and/or other accounts. Movement of paper is replaced with the transmission of images thereby streamlining a payment bank's posting process.

ATM Image Capture 314 may involve the ability to capture transactions made at an ATM. ATM transactions may be processed immediately as opposed to waiting for a courier pick-up and receipt of paper.

LockBox Image Capture 316 may include a National Retail Lockbox, Wholesale Lockbox, Regional Retail Lockbox and/or other types of lockbox services. A National Retail Lockbox may involve a check collection system in which a bank or third party receives, processes and deposits a company's mail receipts. Wholesale Lockbox may involve a moderate number of large dollar remittances, with varied documentation, usually from corporation to corporation. Regional Retail Lockbox may include a local processing site rather than a national or network processing site. Lockbox services reduce process cycle time and the number of times the check is physically touched.

Branch/Teller/Cash Vault Image Capture 318 may include front counter, back counter and other types of image capture. Front Counter may include the ability for a teller (or other representative) to capture transaction image and data during a customer transaction process. Back Counter may include the ability for banking center personnel to capture transaction image and data subsequent to the customer transaction process. Transaction integrity may be increased and timeliness of processing may be improved.

Prime Pass Image Capture 320 may involve capture of check and images at an initial point of contact. Image capture may be moved to the point of entry. Therefore, data is available within minutes rather than hours. Process cycle time and the number of times the check is physically touched may be reduced.

Customer Capture 322 may involve a customer capturing image and data of checks for deposit or clearing through a financial institution and transmitting a file along with delivery of a physical paper item. Productivity efficiencies may be realized through this capture.

Reject Image Capture 324 may involve identifying payment items that can not be process based on insufficient or improper data, payment items with bad images or data and/or other defective data. For example, payment items may include insufficient data, which may mean an invalid account, missing information (e.g., no signature), questionable data, etc. In another example, payment images may be inadequate, such as poor quality of image data, etc.

According to one example, TDM 330 may provide validation and processing to a settlement channel. TDM 330 may process transactions through one or more databases which identify and optimally route the information. In addition, TDM 330 may provide payment decision assignment. TDM 330 may provide account validation, exception item identification, image assisted balancing, recognition technology, flexible settlement channeling, flexible data extract processing and/or other functions.

According to an exemplary embodiment, TDM 330 may include a Central Image Archive 370, Inter-Bank Image Exchange 360, Account Manager 362, Report Manager 364 and/or other functionality, represented by 366. TDM 330 enables banks, e.g., Presenting Bank 302, Paying Bank 304 and/or other participants, to reduce clearing costs, expedite processing times and reduce fraud losses. Therefore, funds, payment information and/or other data are provided more quickly to consumers. While a single archive is shown, multiple archives may be implemented, which may be located at various locations.

Image Exchange 360 may receive requests for data from Presenting Bank 302 where data may be uploaded to Central Image Archive 370. For example, Presenting Bank 302 may upload ECP data, check images and/or other information into Central Image Archive 370. ECP data may be reconciled to images to verify the existence of images for check items. Items with missing images may be flagged.

Notifications may be passed between Presenting bank 302, Paying Bank 304 via Image Exchange 360. Upon a successful load of ECP and image data into the Central Image Archive 370, the Presenting Bank 302 and Paying Bank 304 may be notified of their availability for retrieval. Other conditions may trigger notifications. In addition, other entities may be notified.

Image Exchange 360 may facilitate retrieval of data from Central Image Archive 370 by Paying Bank 304. Data stored in Central Image Archive 370 may be updated via Image Exchange 360. Paying Bank 304 may retrieve ECP data, images and/or other information from TDM 330. Data retrievals may be manual, automatic and/or scheduled.

Account Manager 362 may provide various account functionality, such as fraud identification, positive pay, account reconciliation, return item notification. Fraud identification may use a customer provided file containing stop pay, closed account, account restricted and/or other data to raise an early alert before the paying bank receives the payment item, thereby avoiding the situation where the paying bank tries to process the payment item and post DDA, resulting in a returned item. Positive pay may interface to an account file containing check numbers (or other identifiers) issued by a participating bank, to positively identify commercial checks sent for payment. Items not on the account file may result in a notification and/or returned item, for example. Account reconciliation may provide reconciliation services, such as serial number verification. Return item notification may send images to the presenting bank, on behalf of the returning bank. Return item notification may interface with a customer provided exception file to process several high volume, high dollar exchanges, or other type of payment simultaneously.

TDM 330 may communicate with partner banks (and/or other entities) for sending and/or receiving data on customer account openings, customer account closing, stop-pays and/or other data and events. Thus, accounts and/or other data may be validated. Account validation may involve validating accounts, which may include internal and external accounts, by accessing relational account databases and/or other sources of information. Online, automated account validation may be provided which allows for instant (e.g., same day) resolution of invalid account items.

Exception item identification may involve accessing stop payment relational databases, exception item identification databases for internal and external accounts and compliance databases and/or other databases. Return item risks are reduced where instant identification of stop payments and suspected items may be realized.

Report Manager 364 may facilitate extraction of formatted reports. Reporting criteria may be specified. Report Manager 364 may monitor the flow of payments in and out and may further provide statistics on payments converted and dollars converted so that statistical trends may be identified.

According to another example, recognition software may be implemented at TDM 330 to systemically identify and resolve transaction differences. Transactions may be electronically created and retrieved. In addition, various inefficiencies may be reduced, such as posting errors. Posting and exception errors may be reduced thereby reducing overall risks. Recognition technology may include software identifying a payment item's courtesy amount by reading the courtesy box on a physical payment item (e.g., paper check); software identifying a payment item's legal amount by reading the written amount line on the physical payment item; and/or software identifying any alpha and/or numeric characters on the payment item, such as name, payee, signature, etc. Transaction integrity and fraud detection may be improved. In addition, data mining and new product revenue potential may be provided.

Flexible settlement channeling may involve settlement/decision channel determination, which provides for appropriate settlement channel based on customer preference, item value, time of day, and/or other factors.

Flexible data extract processing may involve providing posting files to internal and/or external entities, which provides for new product potential, intraday posting potential and simplifies online/automated interface to other process applications.

In accordance with an embodiment of present invention, TDM 330 may determine an optimal clearing and final settlement of the transaction items, via Settlement Path 340. Paper, images and/or data associated with the payment item may be routed to an appropriate settlement channel for presentment, conversion, posting to accounts, and/or other actions. For example, optimal channels may include posting to customer accounts without double counting; presenting the paper payment item where the paper is the presentment; presenting an electronic check where the paper remains the presentment; presenting an outgoing image where the image is the presentment; and converting to ACH which may involve ARC conversion and/or other channels.

Post to Customer Accounts 342 may involve posting transactions to a customer DDA, time deposit accounting (TDA), credit card, general ledger or other type of account. DDA may refer to a merchant bank account that is credited or debited for deposits, fees, adjustments, etc. By posting to customer accounts, online automatic account validation and correction of invalid account items may be available. Existing editing routines may be replaced with hard decision processes. For example, a demand account may include an over-draft protection where the account may be tied to a certain account, with one or more alternate accounts. Therefore, if a non-sufficient funds alert is detected, the funding may be supplied from an alternate designated account.

Paper Presentment 344 may involve presenting a paper payment item (e.g., paper check) for clearing and settlement processing.

Electronic Check Presentment (ECP) 346 may involve transmission of data files to a paying bank for editing with subsequent receipt of paper payment items for processing where the paper payment items may be destroyed within a time period (e.g., 60 days) of being imaged or ECP presented.

Outgoing Image Presentment 348 may involve multiple, intraday presentment of payment items via images where the paper payment item may be destroyed within a time period (e.g., 60 days) of being imaged or ECP presented. Incremental funds availability may be improved and return item risk may be reduced.

Store in Archive 350 may involve storing the images and/or data in various locations, including one or more databases, branch location, customer service desktops, image and internet settlement locations, CD-ROMs and/or other storage devices.

Image Assisted Balancing 352 may involve identifying differences and viewing a transaction as it occurs to rapidly resolve identified differences. Research and adjustment case load may be significantly reduced and transaction integrity may be improved.

Conversion to ACH system 332 may involve conversion from the paper payment item to an electronic ACH or other transaction. For example, a Reg CC item may be converted to a Reg E controlled transaction. Data may be converted to other electronic systems 334, as well.

According to an embodiment of the invention, the systems and processes described in this invention may be implemented on any general or special purpose computational device, either as a standalone application or applications, or even across several general or special purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

According to one specific embodiment of the present invention, the system may comprise components of a software system. The system may operate on a network and may be connected to other systems sharing a common database. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

While the invention has been particularly shown and described within the framework of claims processing, it will be appreciated that variations and modifications can be effected by a person of ordinary skill in the art without departing from the scope of the invention. Furthermore, one of ordinary skill in the art will recognize that such processes and systems do not need to be restricted to the specific embodiments described herein.

The invention claimed is:

1. A computer implemented method for processing payment items, the computer implemented method comprising the steps of:
   receiving, at a sorter, a payment item comprising a paper check;
   extracting electronic data from the payment item from an electronic MICR readable line of the payment item;
   imaging the payment item to obtain image data of the payment item;
   verifying that the image data associated with the payment item matches the electronic data;
   determining automatically, using a transaction decision making module, an optimal settlement path from a plurality of possible settlement paths for the payment item wherein the optimal settlement path represents clearing and final settlement of the payment item;
   determining automatically, using the transaction decision making module, that the paper check can be destroyed if the image data matches the electronic data; and
   routing the paper check to be destroyed.

2. The method of claim 1, wherein the image data is converted to electronic image data by optical character recognition where the electronic data and the electronic image data are compared.

3. The method of claim 1, wherein the step of verifying further comprises the step of:
   comparing one or more of a payee name, a date, an amount and a signature associated with the payment item.

4. The method of claim 1, wherein the step of verifying further comprises the step of:
   accessing one or more databases to identify potentially fraudulent activity.

5. The method of claim 1, wherein the step of verifying further comprises the step of:
   determining instructions to modify data associated with the payment item.

6. The method of claim 1, wherein the step of imaging is performed at a front-end device.

7. The method of claim 6, wherein the front-end device comprises one or more of an ATM device and a branch location.

8. The method of claim 1, further comprising the step of:
   destroying the paper check.

9. The method of claim 1, further comprising the step of:
   extracting data from the payment item, and
   sending an electronic offer electronically via an electronic transmission directly to one or more potential customers based at least in part on the extracted data.

10. A computer implemented system for processing payment items, the computer implemented system comprising:
    a receiving module for receiving a payment item comprising a paper check;
    an extracting module for extracting electronic data from the payment item from an electronic MICR readable line of the payment item;
    an imaging module for imaging the payment item to obtain image data of the payment item;
    a matching module verifying that the image data associated with the payment item matches the electronic data;
    a decisioning module for automatically determining an optimal settlement path from a plurality of possible settlement paths for the payment item wherein the optimal settlement path represents clearing and final settlement of the payment item and for automatically determining that the paper check can be destroyed if the image data matches the electronic data; and
    a routing module for routing the paper check to be destroyed.

11. The system of claim 10, wherein the image data is converted to electronic image data by optical character recognition where the electronic data and the electronic image data are compared.

12. The system of claim 10, wherein the matching module compares one or more of a payee name, a date, an amount and a signature associated with the payment item.

13. The system of claim 10, wherein the matching module accesses one or more databases to identify potentially fraudulent activity.

14. The system of claim 10, wherein the matching module determines instructions to modify data associated with the payment item.

15. The system of claim 10, wherein the imaging module is located at a front-end device.

16. The system of claim 15, wherein the front-end device comprises one or more of an ATM device and a branch location.

17. The system of claim 10, further comprising a module for destroying the paper check.

18. At least one non-transitory processor readable carrier for storing a computer program of instructions configured to be readable by at least one processor for instructing the at least one processor to execute a computer process for performing the method as recited in claim 1.

19. A computer implemented method for processing payment items, the computer implemented method comprising the steps of:
- receiving, at a sorter, a payment item comprising a paper check;
- extracting electronic data from the payment item from an electronic MICR readable line of the payment item;
- imaging the payment item to obtain image data of the payment item;
- verifying that the image data associated with-the payment item matches the electronic data, wherein the payment data comprises one or more of a payee name and a date, amount and signature associated with the payment item;
- accessing one or more databases to identify potentially fraudulent activity;
- accessing account data to identify positive and negative account data;
- determining special instructions associated with the payment item, wherein the special instructions comprise one or more of stop payment orders, do not pay items, and illegitimate account data;
- extracting data from the payment item for targeting one or more potential customers;
- determining automatically, using a transaction decision making module, an optimal settlement path from a plurality of possible settlement paths for the payment item, wherein the plurality of possible settlement paths includes ACH, wire transfer, and one or more of IRD, ARC, ECP, posting to a consumer account, and data archive;
- determining automatically, using the transaction decision making module, that the paper check can be destroyed if the image data matches the electronic data; and
- routing the paper check to be destroyed.

20. The method of claim 1, wherein the step of verifying that the image data associated with the payment item matches the electronic data comprises verifying that the entire image data for the paper check matches the electronic data for that paper check.

21. The method of claim 1, comprising:
rejecting the image data if the image data does not match the electronic data.

22. The method of claim 1, wherein the plurality of possible settlement paths includes ACH, wire transfer, and one or more of IRD, ARC, ECP, posting to a consumer account, and data archive.

23. A computer implemented method for paperlessly processing payment items comprising the steps of:
- receiving, from an electronic device, an electronic image of a check to be presented for payment;
- receiving, from the electronic device, an entered payment amount for the check;
- generating, using at least one of a plurality of computer processors, electronic data from the electronic image, the electronic data comprising an imaged payment amount, imaged routing data, imaged account data, and an imaged check number;
- validating, using at least one of the plurality of computer processors, the entered payment amount by determining that the entered payment amount and the imaged payment amount are the same; and
- presenting, based on the electronic data, the electronic image of the check for payment.

24. The method of claim 23, further comprising:
using at least one of the plurality of computer processors, determining that the imaged routing data, imaged account data, and imaged check number are not fraudulent.

25. The method of claim 23, further comprising:
crediting a customer's account with the entered payment amount for the check.

26. The method of claim 23, further comprising:
using at least one of the plurality of computer processors, determining an optimal settlement path from a plurality of possible settlement paths for the check, wherein the plurality of possible settlement paths includes ACH, wire transfer, and one or more of IRD, ARC, ECP, posting to a consumer account, and data archive.

* * * * *